Dec. 10, 1968     R. S. HANSON     3,415,978
INFRARED SURFACE COOKING UNIT
Filed Dec. 17, 1965

INVENTOR.
Robert S. Hanson
BY J.C. Evans
His Attorney

3,415,978
INFRARED SURFACE COOKING UNIT
Robert S. Hanson, Dayton, Ohio, assignor to General Motors Corporation, Detroit, Mich., a corporation of Delaware
Filed Dec. 17, 1965, Ser. No. 514,487
2 Claims. (Cl. 219—415)

ABSTRACT OF THE DISCLOSURE

A heating unit for association with the cooking top of a range includes a frangible annular infrared transmissive member forming a utensil receiving well. An annular reflector surrounds the member in spaced relation therewith. An annular electric infrared heating unit is located in the space between the reflector and member for emitting radiant heat inwardly of the well. The frangible member and the reflector are supported by shock absorbing and thermally isolating means, thereby protecting the frangible member against mechanical shock and reducing direct conductive heat transfer from the frangible member and reflector to the remainder of the heating unit structure.

---

Figure 1:
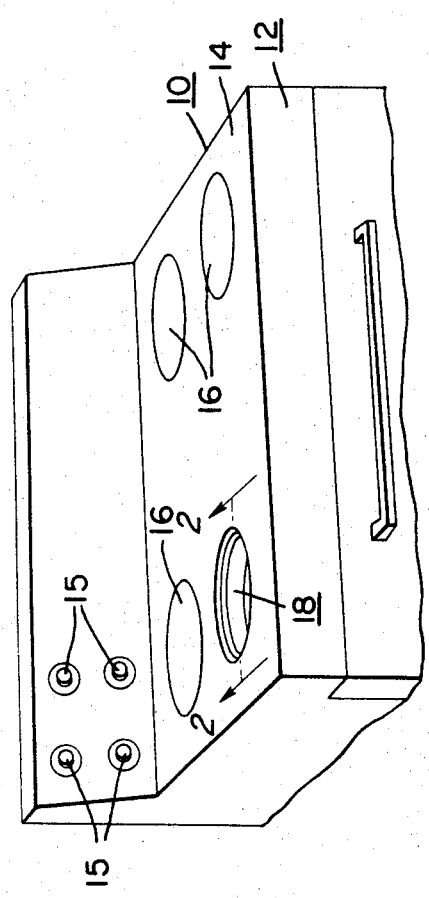

This invention relates to surface heating units and more particularly to infrared type surface heating units.

In order to improve the responsiveness of surface heating units to achieve quick-heat characteristics therein, several surface heating units have been developed that include an upper supporting plate of glass or glass ceramic-like material and an electrically energizable resistance element for transferring heat through the utensil supporting plate for heating the utensil. In such arrangements one problem is that of eliminating breakage of the utensil supporting plate either by mechanical loading thereon or thermal stresses produced therein by rapid changes in the temperature of the utensil supporting plate. An example of such an arrangement is set forth in United States Patent No. 2,870,316, issued Jan. 20, 1959.

An object of the present invention, therefore, is to improve surface heating units by the provision of an arrangement that eliminates an easily breakable utensil supporting plate portion and wherein an electrically energizable element is incorporated that substantially immediately raises the temperature of a utensil by direct infrared radiation.

A further object of the present invention is to improve surface heating units by the provision of a highly responsive infrared surface heating assembly that includes support means forming a utensil receiving well including an infrared transmissive surface portion therein and further including an infrared emissive element for directing radiant energy through the infrared transmissive surface portion to heat a utensil supported within the utensil receiving well.

Still another object of the present invention is to improve surface heating units of the infrared type by the provision of a utensil supporting structure including a base member and a cylindrical open-ended side wall member forming a well for supportingly receiving a utensil to be heated and wherein a reflector member is supported in spaced relationship with the cylindrical member to form a space around the cylindrical member in which an infrared heating element is located in generally spaced relationship to other portions of the unit and energizable to direct radiant energy through the cylindrical side wall radially inwardly of the utensil well for heating a utensil therein.

A further object is to improve infrared surface heating units of the type set forth in the preceding object by the provision of a combination shock absorbing support element that supports the cylindrical side wall on the base member and which further serves to thermally isolate the cylindrical side wall from the base member and wherein the infrared heating element includes a tubular member of infrared transmissive material that encloses a high-temperature resistance element energizable into an infrared radiation range for producing energy transfer from the heating element through the infrared transmissive cylindrical side wall to heat a utensil supported within the well.

Further objects and advantages of the present invention will be apparent from the following description, reference being had to the accompanying drawings wherein a preferred embodiment of the present invention is clearly shown.

Figure 2:
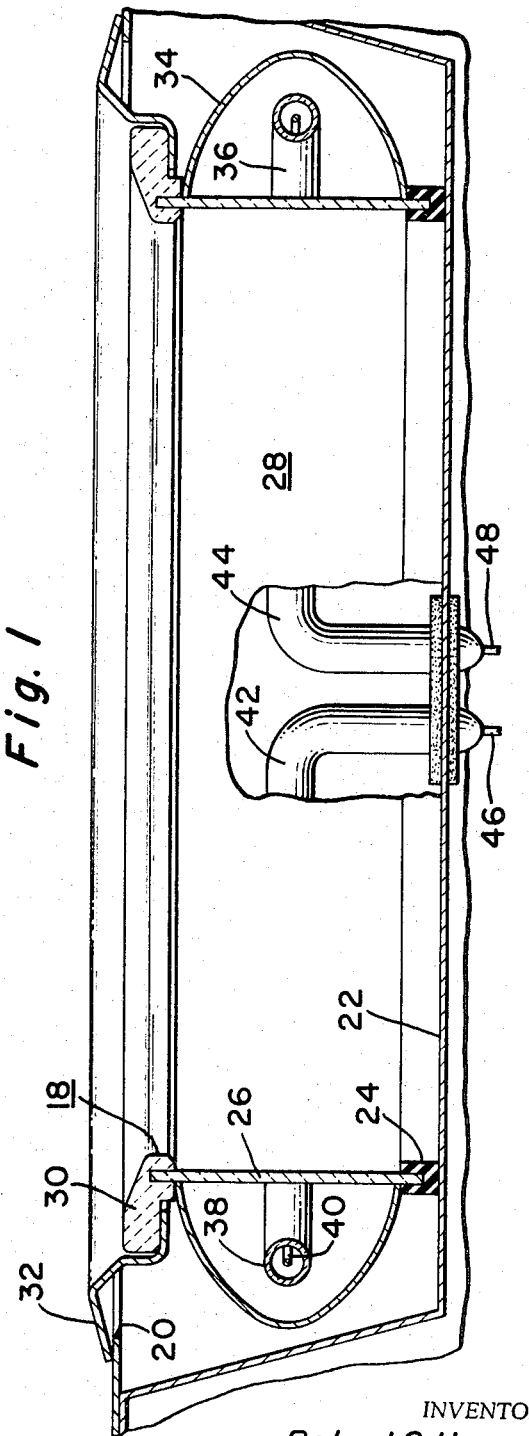

In the drawings:

FIGURE 1 is a view in perspective of a domestic range including the surface heating unit of the present invention; and FIGURE 2 is an enlarged view in vertical section taken along the line 2—2 of FIGURE 1.

Referring now more specifically to the drawing, a domestic range 10 is illustrated that includes an outer casing 12 having a top portion 14. In a rearwardly located control panel are located a plurality of controllers 15 for selectively energizing standard surface heating units 16 and an improved infrared surface heating assembly 18 in the top across a suitable power source.

The assembly 18 is located within an opening 20 in the top 14 and includes a support member 22 that has an upper edge portion thereof suitably secured to the top 14 around the opening 21 therein. Supported on the bottom of the support member 22 is a resilient, heat resistant support ring 24 that supportingly receives a cylindrical open-ended member 26 that forms in cooperation with the bottom of the support member 22 a utensil receiving well or space 28. The member 26 preferably is constructed from a suitable high-strength material having infrared transmissive properties such as quartz, a recrystallized glass ceramic such as Cer-Vit, manufactured by Owens-Illinois, or the like.

The top edge of the cylindrical member 26 is secured to an upper support ring 30 that in turn is supported by a trim ring 32 having its outer peripheral edge supported on the top 14 around the opening 21 therein. The resilient support ring 24 protects the cylindrical member 26 against mechanical shock loadings thereon and the ring 24 and the ring 30 reduce direct conductive heat transfer from the cylindrical member 26 to the remainder of the surface unit 18 for reasons to be discussed.

In the illustrated arrangement cylindrical member 26 serves as a window through which radiant energy can be directed into heat transfer relationship with a utensil located within the well or space 28. An annular parabolic reflector plate 34, such as polished aluminum, is supported by the annular shock absorbing ring 24 and located in spaced relationship with the cylindrical member 26 to form an open space 35 therebetween in which is located an infrared heater assembly 36. The infrared surface heating assembly 36 includes a ring-like tubular sheath 38 of a suitable infrared transmissive material such as quartz that encloses a resistance element 40 constructed of a nickel-chromium or iron-chromium alloy or other suitable high temperature resistance material. The ring-like tubular sheath 38 has end portions 42, 44 thereon directed through a resilient shock absorbing grommet 45 in the bottom of the support plate 22 from which terminals 46, 48 are directed for connection across a suitable power source for energizing the resistance element 40.

When the resistance element in the illustrated arrangement is energized, by virtue of its isolation from the remainder of the unit, it is quickly elevated to a high temperature range to produce infrared radiation therefrom that either passes directly through the cylindrical member 26 against a utensil supported within the well 28 or is reflected off the reflector plate 34 to be passed through the cylindrical member 26 for heating such a supported utensil.

By virtue of the illustrated arrangement, the need for a breakable upper utensil supporting plate is eliminated in the surface heating unit assembly and furthermore the resistance element itself is substantially completely isolated against mechanical shock produced by locating a utensil in heat transfer relationship with the improved assembly 18.

While the embodiment of the present invention as herein disclosed constitutes a preferred form, it is to be understood that other forms might be adopted.

What is claimed is as follows:

1. An infrared surface heating unit for association with a cooking top comprising, an annular support ring, a base support member located in spaced relationship with said annular support ring, a cylindrical open-ended member of frangible infrared transmissive material having one edge thereof secured to said support ring, a resilient annular shock absorbing member supported by said base member and secured to the other edge of said cylindrical member, said cylindrical member and base support member forming a utensil receiving well, an annular infrared reflector surrounding said well forming member in spaced relationship thereto, said annular infrared reflector being supported by said shock absorbing member out of direct contact with said base member, said shock absorbing member being made of a poor heat conductivity material to limit conductive heat transfer from said cylindrical member to said base support member, an annular infrared heating unit located between said cylindrical member and said reflector for directing radiant energy radially inwardly of said well to heat a utensil supported therein.

2. In the combination of claim 1, said annular infrared heating unit including an outer sheath of infrared transmissive material and a high-temperature resistance element located within said sheath energizable into an infrared radiation range.

References Cited

UNITED STATES PATENTS

| | | | |
|---|---|---|---|
| 1,208,142 | 12/1916 | Hadaway | 219—417 |
| 1,730,042 | 10/1929 | Pendleton et al. | 219—417 |
| 1,825,406 | 9/1931 | Lipham | 219—417 X |
| 2,864,025 | 12/1958 | Foote et al. | |
| 2,954,826 | 10/1960 | Sievers | 219—354 X |
| 3,227,065 | 1/1966 | Litman | 219—342 X |
| 3,345,498 | 10/1967 | Siegla | 219—461 X |
| 3,355,575 | 11/1967 | Bassett et al. | 219—464 |

FOREIGN PATENTS

| | | |
|---|---|---|
| 791,716 | 10/1935 | France. |
| 866,896 | 6/1941 | France. |

ANTHONY BARTIS, *Primary Examiner.*

U.S. Cl. X.R.

219—461, 354, 347, 433, 521